Aug. 7, 1956   D. D. BALLEW   2,757,620
DOUGHNUT FILLING MACHINE
Filed March 26, 1954   2 Sheets-Sheet 1

INVENTOR.
DALLAS D. BALLEW
BY Howard J. Whelan
ATTORNEY

Aug. 7, 1956

D. D. BALLEW 2,757,620

DOUGHNUT FILLING MACHINE

Filed March 26, 1954

*INVENTOR.*
DALLAS D. BALLEW
BY *Howard J. Whelan.*
ATTORNEY

United States Patent Office 2,757,620
Patented Aug. 7, 1956

2,757,620

DOUGHNUT FILLING MACHINE

Dallas D. Ballew, Baltimore City, Md.

Application March 26, 1954, Serial No. 419,037

2 Claims. (Cl. 107—1)

This invention relates to dispensers for filling cakes, doughnuts, and other confections with syrups, jellies, preserves and other items suitable for eating as well as making a combination that is attractive and consumable. More particularly it pertains to a device of the dispensing type that provides for the mechanical propulsion of the semi-fluid filling in predetermined quantities through a spout of convenient design to the article of food brought into its sphere of functioning, through the manual positioning by an operator and is an improvement over that shown in Patent No. 2,669,947 issued February 23, 1954.

In a present form of dispenser of this type, difficulty is experienced in preventing the device from gumming up the mechanism and in another type the fluid filling material seeps around the exposed solenoid and other pumping mechanism requiring them to be taken apart for cleaning, in addition the filling material drips down over the starting switch plunger causing it to gum up.

This invention anticipates these difficulties in an effective and economical manner. The filling is held in a reservoir or filling tank, with an outlet formed therein (at the bottom). It has a funnel leading to a cylinder vertically extended therefrom. A rod with a disc and foot-valve attached at its lower end reciprocates in this cylinder under the action of a solenoid positioned above and out of contact with the filling material in the reservoir or filling tank and measures out the amount of filling to be dispensed. It forces the filling out by intermittent strokes of the disc and foot valve from the cylinder into a spout arranged to deliver it to the article of food presented manually by the operator for filling.

The invention has among its objects the provision of a new and improved filling dispenser for injecting a predetermined amount of jellies and other edible products into articles of food that will avoid some of the disadvantages and limitations of the prior art.

Another object of the invention is to provide a new and improved filling dispenser for articles of food, that will have its measuring and propelling mechanism out of contact with the filling medium and be easily assembled or disassembled for cleaning and other purposes.

A further object of the invention is to provide a new and improved filling dispenser for filling articles of food that will operate intermittently to deliver predetermined quantities of filling material to the articles to be processed as they are brought up against it.

A further object of the invention is to provide a new and improved filling dispenser provided with adjustments to control the amount of pressure applied to the filling medium to suit the viscosity of the filler used, and adjustments to control the amount of filler injected into each article on each stroke.

A further object of the invention is to provide a new and improved filling dispenser comprising a container for the filling material removably positioned in said device and having a removable spout and cap to cover the aperture after removal of the spout when filling the reservoir or filling tank with material.

Other objects will become apparent as the invention is more fully set forth.

For a better understanding of the invention, its principles, objects and operation, reference is made to the accompanying drawings wherein a particular form of the invention is illustrated by way of example. These drawings when used in conjunction with the following description indicate a preferred form, while the claims emphasize the scope of the invention.

In the drawings.

Similar reference numerals refer to similar parts throughout the drawings.

Figure 1:
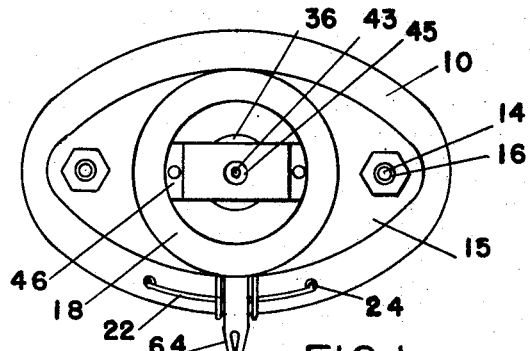
Figure 1 is a plan view of the filler mechanism embodying this invention.
Figure 2:
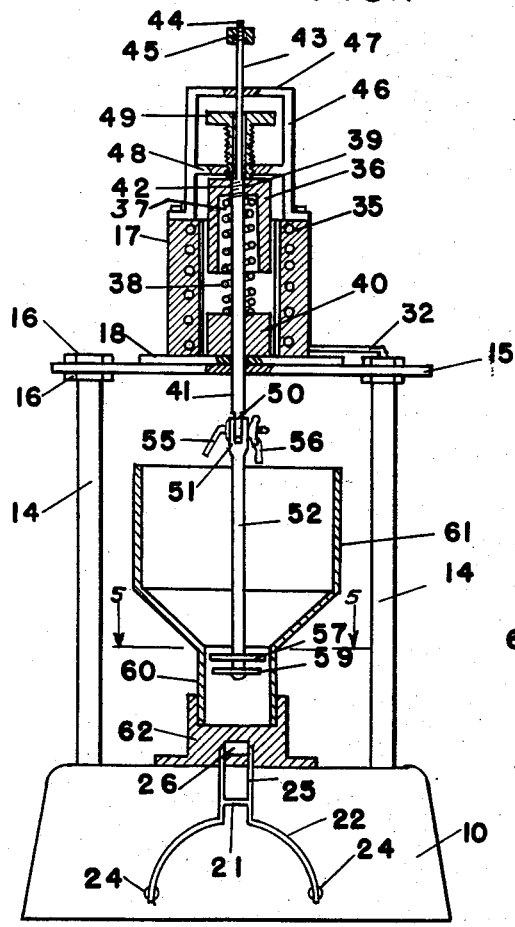
Figure 2 is a front elevation of Figure 1 with parts broken away to show its inner construction.
Figure 3:
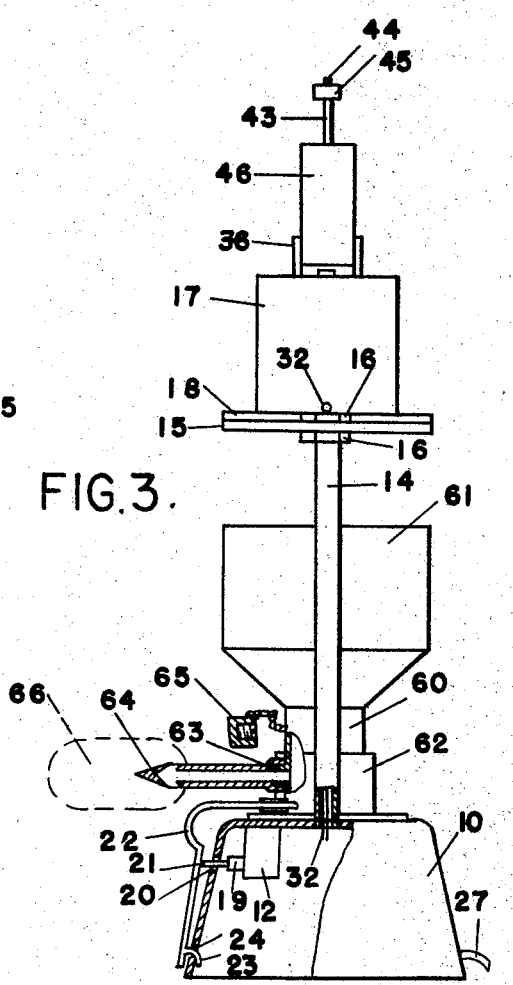
Figure 3 is a side elevation of Figure 2 with parts broken away to show the inner construction of the spout and base.
Figure 4:
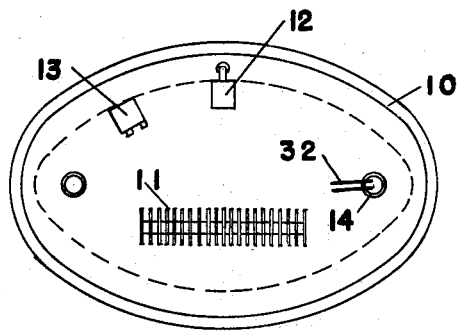
Figure 4 is an underside view of the base showing the electrical apparatus affixed thereto.
Figure 5:
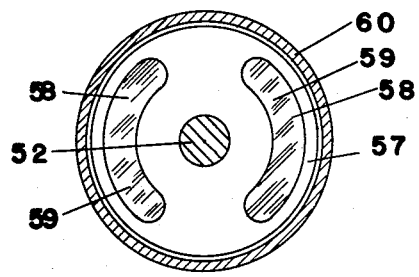
Figure 5 is a sectional view taken along line 5—5 of Fig. 2.
Figure 6:
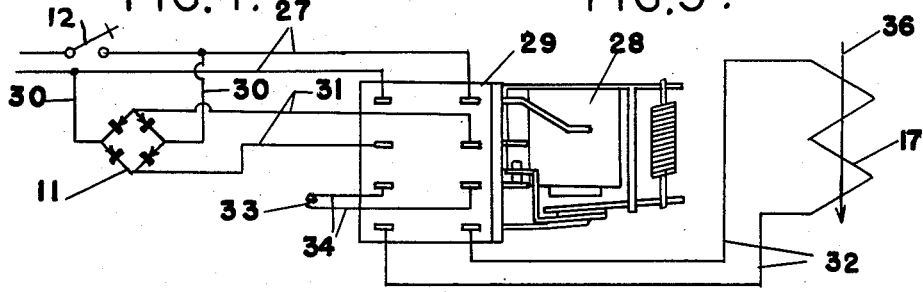
Figure 6 is a wiring diagram of the device.

Referring to Figures 2, 3 and 4, particularly, in which the invention is illustrated partly in section, a base 10 consists of a shell forming an inclosure in which a selenium rectifier 11, microswitch 12 and relay 13 are located. Projecting upwardly from the top of the base are two hollow supports 14 attached at their upper ends to a plate 15 preferably by nuts 16 for easy removal. A solenoid 17 has a flange 18 through which screws pass to hold it securely to the plate 15. The microswitch 12 is internally mounted with its operating button 19 positioned in back of a hole 20 in the front wall of the base for facile operation by a finger 21 forming part of the handle mechanism 22. The handle mechanism 22 is of semiradial design with hooks 23 formed at its lower ends to be pivotally attached in holes 24 in the front wall of the base for easy removal for cleaning or replacement. The upper end 25 of the handle mechanism 22 is provided with a weight 26 to keep the finger 21 in contact with operating button 19 of microswitch 12 without closing same. When the handle mechanism 22 is pressed inwardly through contact by the operator, the finger 21 presses the operating button 19 of the microswitch 12 inwardly and closes the electric circuit. When the pressure is removed, the handle mechanism 22 recoils outwardly and the switch button returns to open position. The switch 12 is connected in the electric circuit 27 so as to energize the magnet 28 of the relay 29 and through connections 30 to the selenium rectifier 11, then from the selenium rectifier 11, along conductors 31 to the relay 29 and along the circuit 32 to the solenoid 17 to expel the filling material from the machine into the doughnut or other food products. When the pressure is released on the handle 22 the switch 12 is opened causing the circuits 32 to carry the stored electromotive force to be quickly discharged from the solenoid 17 through connections 34 to a lamp or resistor 33 to speed up the action of the solenoid 17 on the return stroke.

The solenoid 17 has coil windings 35 within its housing which induce a flux of magnetism tending to draw its iron core plunger 36 downwardly. The plunger is provided with a passage 37 passing longitudinally until it meets a threaded portion 39. This passage serves to house a spring 38 used to return the iron core plunger to its uppermost position. A spacer 40 is positioned inside the solenoid as shown in Figure 2, to raise the point of contact with the plunger 36 to a point of greatest pull in the solenoid for maximum power. A rod 41 preferably of brass is provided with threads 42 to screw into the threaded part 39 of the core plunger 36. The rod is restricted at 43 and has a threaded portion 44 to receive a nut 45 used to contact the upper shelf 47 of the bracket 46 to control the pressure applied to the specific filler used. A thin filler uses less pressure than that required for pumping a thick filler into the edible product. An adjustable collar 49 is threadably positioned in the lower shelf 48 and presses down on the core plunger 36 to control the length of its stroke and the amount of filling material dispensed at each stroke. The lower end of the rod 41 is restricted at 50 to fit into a clevis 51 formed on the pump rod 52 and joined together by a screw 53 and wing nut 54, which are weighted at 55 and 56 respectively to prevent them from becoming unloosened during the operation of the machine. The lower end of the pump rod 52 is affixed to a pump disc 57 having slots 58 to allow the filling material to pass therebetween so it can pass into the neck 60 of funnel 61. A foot valve 59 is slidably attached to the pump rod 52 below the disc 57. A funnel support 62 is attached to the base 10 and is provided with a threaded outlet 63 to receive a spout 64 for use when filling an edible product, and with a cap 65 for use when filling the machine ready for operation.

The operation of the dispenser is as follows: The reservoir of filling tank is supplied with filling material to a suitable level. The operator then operates the handle 22 and microswitch 12 a number of times to fill the spout. When the system from the filling tank to the dispensing nozzle or spout is filled, it is ready for use. The operator then pushes the doughnut or other article of food 66 over the nozzle or spout 64 and as he does so presses against the handle mechanism 22 until it operates the microswitch 12. The microswitch throws the solenoid into the circuit and magnetically draws the core plunger 36 downwardly, against the resilient resistance of the spring 38. This plunger action forces the pump disc 57 and foot valve 59 downwardly to eject the filling material from the nozzle or spout into the doughnut. The foot valve 59 closes the openings 58 in the pump disc 57 to prevent the filling material from returning to the tank. On the removal of the doughnut the handle 22 moves outward and releases the button or finger 21 of the switch 12, and opens the electrical circuit allowing the solenoid to discontinue its attraction and downward movement of the plunger and pump disc 57. The plunger then rises under the resiliency of the spring 38 until it contacts the lower end of the collar 49 adjustably positioned in the lower shelf 48 of bracket 46 and controls the amount of filling material delivered to each doughnut or other food product to be filled, the foot valve 59 falls away from the openings 58 in the pump disc 57 on the upward stroke and permits the filling material to enter the neck 60 of the funnel 61 ready for the next operation of filling another doughnut. The process continues indefinitely. The nut 45 is adjustably positioned on the threaded portion of the rod 41 and on its downward stroke contacts the upper shelf 47 of bracket 46 and controls the amount of pressure to be applied to the filling material to drive it into the doughnut. The equipment can be dismantled quickly and easily for inspection, cleaning or repair and thereby offers all of the features desirable from a sanitary point of view. It is arranged so that the filling material is encased in the filling tank which is leakproof and easily removable and interchangeable with other filling tanks and the parts will register in their correct positions automatically when assembled in the order required of them.

The adjustment of the nut 45 on the threaded portion of the rod 41 controls the amount of space between the bottom of the core plunger 36 and the upper face of the spacer 40 and controls the amount of pressure applied to the filling material by the disc 57. When the space between the bottom of the core plunger 36 and the upper face of the spacer 40 is about one-quarter of an inch the pressure will be weaker and will be suitable for filling with light materials. When the space is about one-eight of an inch, the pressure will be stronger and suitable for medium weight materials. When the space is eliminated so the core plunger contacts the spacer the pressure is greater and more suitable for filling edibles with heavier materials. The spacing mentioned above is not to be used as a limitation as it is understood other adjustments of the space between the plunger and spacer can be used and will vary the pressure applied to the filling medium to force it into the edible product.

While but one general form of the invention is shown in the drawings and described in the specification, it is not desired to limit this application for patent to this particular form as it is appreciated that other forms of construction could be made that would use the same principles and come within the scope of the appended claims.

Having thus described the invention, what is claimed is:

1. A machine for injecting edible fluid filling into pastry articles, said machine comprising a hollow base, supporting means carried by said base and extending vertically upward therefrom, a plate horizontally carried by said supporting means at the upper end thereof and spaced from the base, a solenoid carried by said plate, said solenoid being of hollow formation, a hollow core plunger reciprocable within the solenoid, a rod secured to said core plunger and having an upward extension and a downward extension, a funnel carried by the base to receive the filling, said funnel terminating in a reduced cylindrical neck in proximity to the base and said downward extension of the aforesaid rod having a piston carried thereby and reciprocable in said reduced cylindrical neck, a nozzle carried by the cylindrical neck outwardly thereof and in open communication with the inside of the neck, electrical circuit means for energizing said solenoid, said means including a switch carried by the base adjacent said nozzle, a handle carried by and outwardly of the base and normally biased towards said switch, said switch closing said circuit means by the operator while simultaneously placing an article of pastry upon the nozzle, said solenoid when energized moving the core plunger in a downward direction to force the filling outwardly of the cylindrical neck through the nozzle, by movement of the piston, and into the article of pastry, a bracket carried by the solenoid and extending upwardly thereof, means carried by the aforesaid upward extension of the rod and cooperating with the bracket to limit the amount of downward movement of the core plunger, and spring means to return the core plunger upwardly when the switch is released to open the circuit means to the solenoid.

2. A machine as set forth in claim 1 including adjustable means carried by the bracket to limit upward movement of the core plunger.

References Cited in the file of this patent
UNITED STATES PATENTS

| 1,146,576 | Katzinger | July 13, 1915 |
| 1,160,368 | Bozell et al. | Nov. 16, 1915 |
| 1,898,004 | Demka et al. | Feb. 21, 1933 |
| 2,178,345 | Masson | Oct. 31, 1939 |
| 2,669,947 | Ballew | Feb. 23, 1954 |